(12) United States Patent
Yang et al.

(10) Patent No.: US 12,436,244 B2
(45) Date of Patent: Oct. 7, 2025

(54) TIME-OF-FLIGHT DISTANCE MEASURING METHODS AND RELATED DISTANCE MEASURING SYSTEMS

(71) Applicant: SHENZHEN GOODIX TECHNOLOGY CO., LTD., Guangdong (CN)

(72) Inventors: Meng-Ta Yang, Guangdong (CN); Chung-Te Li, Guangdong (CN)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 1066 days.

(21) Appl. No.: 17/468,062

(22) Filed: Sep. 7, 2021

(65) Prior Publication Data
US 2021/0405162 A1    Dec. 30, 2021

Related U.S. Application Data

(63) Continuation of application No. PCT/CN2020/095029, filed on Jun. 9, 2020.

(51) Int. Cl.
*G01S 7/48* (2006.01)
*G01S 7/4861* (2020.01)
*G01S 7/4863* (2020.01)

(52) U.S. Cl.
CPC .......... *G01S 7/4861* (2013.01); *G01S 7/4863* (2013.01)

(58) Field of Classification Search
USPC ................................................ 356/4.01, 5.01
See application file for complete search history.

(56) References Cited

U.S. PATENT DOCUMENTS

| 7,944,548 B2 * | 5/2011 | Eaton | G01C 11/025 356/5.07 |
| 8,254,437 B2 * | 8/2012 | Fujita | H04B 1/7174 327/1 |

(Continued)

FOREIGN PATENT DOCUMENTS

| CN | 1041654 A | 4/1990 |
| CN | 101034155 A | 9/2007 |

(Continued)

OTHER PUBLICATIONS

English Abstract of CN110632578A.

(Continued)

*Primary Examiner* — James R Hulka
(74) *Attorney, Agent, or Firm* — WPAT, P.C.; Anthony King

(57) ABSTRACT

A time-of-flight distance measuring system includes: intermittently transmitting a plurality of first pulses, wherein the plurality of first pulses are reflected by a target to generate a plurality of first reflected signals; using a TOF sensor to selectively perform a first signal sampling or a second signal sampling upon the plurality of first reflected signals respectively to generate a first sampling result, wherein there is a first time difference between a starting time point of the first signal sampling and a transmitting time point of the corresponding first pulse, and the first signal sampling lasts for a first predetermined time, and there is a second time difference between a starting time point of the second signal sampling and a transmitting time point of the corresponding first pulse, and the second signal sampling lasts for second predetermined time, and the first time difference is smaller than the second time difference.

17 Claims, 6 Drawing Sheets

(56) References Cited

U.S. PATENT DOCUMENTS

| | | | |
|---|---|---|---|
| 10,386,487 B1 | 8/2019 | Wilton et al. | |
| 10,627,490 B2* | 4/2020 | Hall | G01S 17/10 |
| 10,996,324 B2* | 5/2021 | Boutaud | G01S 17/89 |
| 11,598,862 B2* | 3/2023 | Henderson | G01S 7/4863 |
| 12,181,576 B2* | 12/2024 | Yang | H10F 39/803 |
| 2009/0122295 A1* | 5/2009 | Eaton | G01S 17/89 342/357.31 |
| 2010/0040168 A1* | 2/2010 | Fujita | H04L 27/02 375/295 |
| 2017/0219695 A1* | 8/2017 | Hall | G01S 17/42 |
| 2019/0346541 A1 | 11/2019 | Boutaud | |
| 2020/0158838 A1* | 5/2020 | Henderson | G01S 7/4815 |
| 2021/0018623 A1* | 1/2021 | Yang | G01S 17/36 |
| 2021/0405192 A1* | 12/2021 | Yang | G01S 7/4816 |
| 2021/0405193 A1* | 12/2021 | Yang | G01S 7/4863 |

FOREIGN PATENT DOCUMENTS

| | | | | |
|---|---|---|---|---|
| CN | 101138213 | A | | 3/2008 |
| CN | 108603932 | A | | 9/2018 |
| CN | 109313264 | A | | 2/2019 |
| CN | 109696690 | A | | 4/2019 |
| CN | 110361715 | A | | 10/2019 |
| CN | 110632578 | A | | 12/2019 |
| CN | 111108411 | A | | 5/2020 |
| CN | 111208528 | A | | 5/2020 |
| CN | 111837053 | A | | 10/2020 |
| EP | 0362992 | A2 | * | 4/1990 |
| EP | 3572836 | A1 | | 11/2019 |
| WO | 2020042166 | A1 | | 3/2020 |
| WO | 2020106813 | A1 | | 5/2020 |
| WO | WO-2021068156 | A1 | * | 4/2021 ............ G01S 17/08 |

OTHER PUBLICATIONS

English Abstract of CN1041654A.
English Abstract of CN101034155A.
English Abstract of CN101138213A.
English Abstract of CN108603932A.
English Abstract of CN109313264A.
English Abstract of CN109696690A.
English Abstract of CN110361715A.
English Abstract of CN111108411A.
English Abstract of CN111208528A.
English Abstract of CN111837053A.
As-filed PCT Request of PCT/CN2020/095029.
As-filed PCT Application of PCT/CN2020/095029.
International Searching Authority (ISA) Form 202—Notification of Receipt of Search PCT/CN2020/095029.
International Searching Authority (ISA) Form 210—International Search Report of PCT/CN2020/095029.
International Searching Authority (ISA) Form 220—Notification of Transmittal of the International Search Report and the Written Opinion of the International Searching Authority, or the Declaration of PCT/CN2020/095029.
International Searching Authority (ISA) Form 237—Written Opinion of PCT/CN2020/095029.
Notification of the International Application number and of the International Filing Date—Form 105 of PCT/CN2020/095029.

* cited by examiner

TIME-OF-FLIGHT DISTANCE MEASURING METHODS AND RELATED DISTANCE MEASURING SYSTEMS

CROSS-REFERENCE TO RELATED APPLICATIONS

This application is a continuation of International Application No. PCT/CN2020/095029, filed on Jun. 9, 2020, the disclosure of which is hereby incorporated by reference in its entirety.

TECHNICAL FIELD

The present application relates to distance measuring and depth sense techniques, particularly a time-of-flight distance measuring method and a related distance measuring system.

BACKGROUND

Among the time-of-flight distance measuring techniques, pulse modulation is a simple measurement mechanism that measures the distance of a target using the time difference between the transmission and reception of an optical pulse. Pulse modulation requires high accuracy in time measurement. However, in high dynamic range (HDR) applications, there is still much room for improvement in the range of distance measurement and in the regulation of the degree to which the distant information is affected by the background light.

SUMMARY OF THE INVENTION

One embodiment of the present application discloses a time-of-flight (TOF) distance measuring method, which includes: intermittently transmitting a plurality of first pulses from a pulse generation unit, wherein the plurality of first pulses are reflected by a target to generate a plurality of first reflected signals; controlling a TOF sensor to selectively perform a first signal sampling or a second signal sampling upon the plurality of first reflected signals respectively to generate a first sampling result, wherein there is a first time difference between a starting time point of the first signal sampling and a transmitting time point of the first pulse corresponding to the first signal sampling, and the first signal sampling lasts for a first predetermined time, and there is a second time difference between a starting time point of the second signal sampling and a transmitting time point of the first pulse corresponding to the second signal sampling, and the second signal sampling lasts for second predetermined time, and the first time difference is smaller than the second time difference; detecting TOFs of the plurality of first pulses from the pulse generation unit to the TOF sensor according to the first sampling result; and determining a distance between the target and a reference position according to the TOFs.

Another embodiment of the present application discloses a TOF distance measuring system, which includes: a pulse generation unit; a control circuit, coupled to the pulse generation unit and configured to control the pulse generation unit to intermittently transmit a plurality of first pulses, wherein the plurality of first pulses are reflected by a target to generate a plurality of first reflected signals; and a TOF sensor, controlled by the control circuit and configured to selectively perform a first signal sampling or a second signal sampling upon the plurality of first reflected signals respectively to generate a first sampling result, wherein there is a first time difference between a starting time point of the first signal sampling and a transmitting time point of the first pulse corresponding to the first signal sampling, and the first signal sampling lasts for a first predetermined time, and there is a second time difference between a starting time point of the second signal sampling and a transmitting time point of the first pulse corresponding to the second signal sampling, and the first time difference is smaller than the second time difference, and the second signal sampling lasts for second predetermined time, and detecting TOFs of the plurality of first pulses from the pulse generation unit to the TOF sensor according to the first sampling result, and determining a distance between the target and a reference position according to the TOFs.

Yet another embodiment of the present application discloses a TOF distance measuring method, which includes: intermittently transmitting a plurality of pulse sets from a pulse generation unit, wherein each pulse set includes a first pulse and a second pulse, the intensity of the first pulse and the intensity of the second pulse are different, and the plurality of pulse sets are reflected by a target to generate a plurality of reflected signal sets; controlling a TOF sensor to perform signal sampling upon the plurality of reflected signal sets respectively to generate a sampling result, wherein the signal sampling lasts for a predetermined time; detecting TOFs of the plurality of pulse sets from the pulse generation unit to the TOF sensor according to the sampling result; and measuring the distance between the target and a reference position according to the TOFs.

Still another embodiment of the present application discloses a TOF distance measuring system, which includes: a pulse generation unit; a control circuit, coupled to the pulse generation unit and configured to control the pulse generation unit to intermittently transmit a plurality of pulse sets, wherein each pulse set includes a first pulse and a second pulse, the intensity of the first pulse and the intensity of the second pulse are different, and the plurality of pulse sets are reflected by a target to generate a plurality of reflected signal sets; and a TOF sensor, controlled by the control circuit and configured to perform signal sampling upon the plurality of reflected signal sets respectively to generate a sampling result, wherein the signal sampling lasts for a predetermined time; the TOF sensor further detects TOF of the plurality of pulse sets from the pulse generation unit to the TOF sensor according to the sampling result, and measure the distance between the target and the distance measuring system according to the TOFs.

The TOF distance measuring method and related distance measuring system disclosed in this application can enhance the effectiveness of high dynamic range sampling by modulating the sampling interval or pulse pattern.

DETAILED DESCRIPTION

Figure 1:
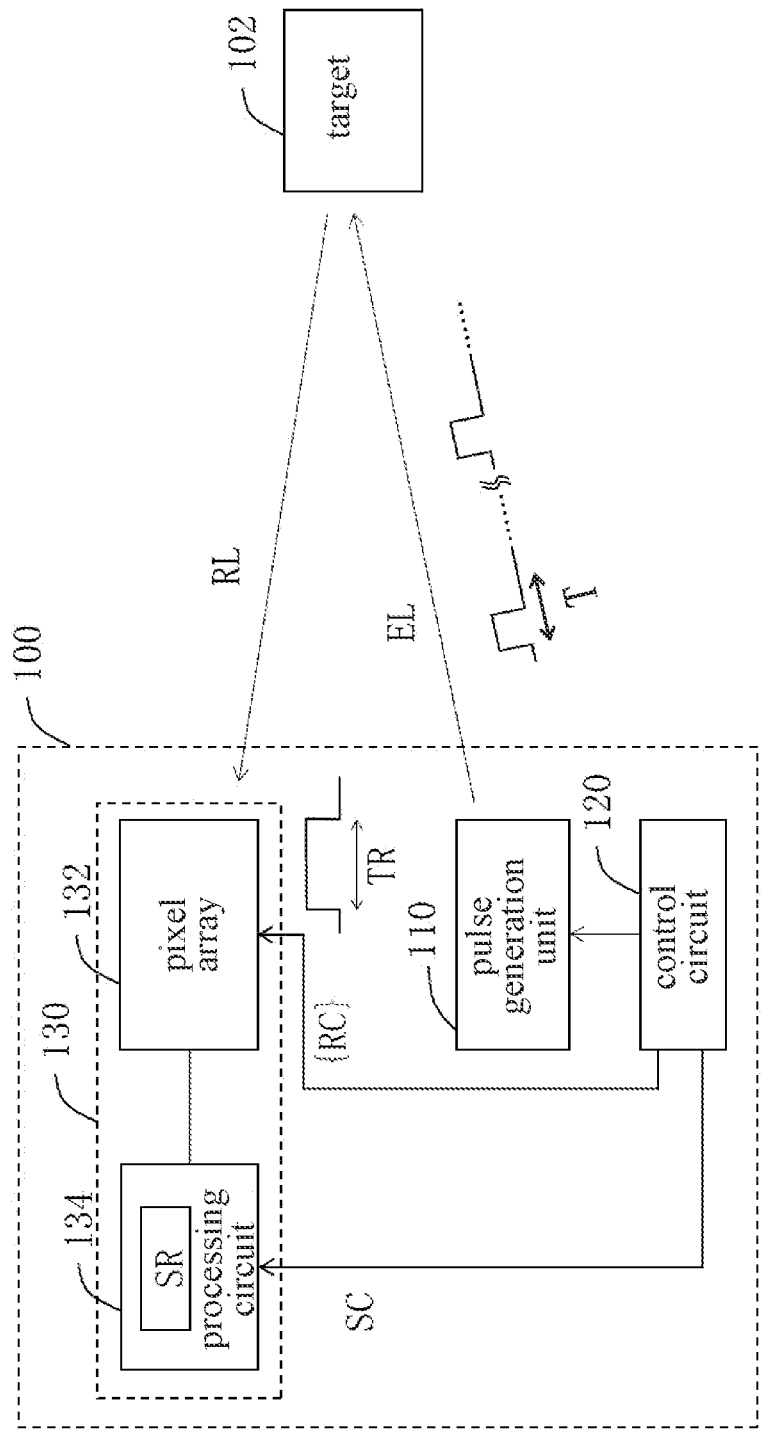
FIG. 1 is a functional block diagram illustrating time-of-flight (TOF) distance measuring system according to one embodiment of the present disclosure.

The following disclosure provides many different embodiments or examples for implementing different features of the present disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various embodiments. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to discuss one element or feature's relationship to another element(s) or feature(s) as illustrated in the drawings. These spatially relative terms are intended to encompass different orientations of the device in use or operation in addition to the orientation depicted in the drawings. The apparatus may be otherwise oriented (e.g., rotated by 90 degrees or at other orientations), and the spatially relative descriptors used herein may likewise be interpreted accordingly.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "the same" generally means within 10%, 5%, 1%, or 0.5% of a given value or range. Alternatively, the term "the same" means within an acceptable standard error of the mean when considered by one of ordinary skill in the art. As could be appreciated, other than in the operating/working examples, or unless otherwise expressly specified, all of the numerical ranges, amounts, values, and percentages (such as those for quantities of materials, durations of times, temperatures, operating conditions, ratios of amounts, and the likes) disclosed herein should be understood as modified in all instances by the term "the same." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Here, ranges can be expressed herein as from one endpoint to another endpoint or between two endpoints. All ranges disclosed herein are inclusive of the endpoints, unless specified otherwise.

The TOF distance measuring schemes disclosed in the present application can use a pulse generation unit to intermittently transmit a pulse and use the TOF sensor to continuously perform multiple times of signal sampling, to obtain a sampling result corresponding to a reflected signal (generated by a target reflecting the single pulse), thereby achieving a sensing mechanism based on continuous wave modulation of the pulse modulation. A first scheme of the present application is directed to adjusting the sampling interval of a TOF sensor, and a second scheme of the present application is directed to adjusting the pulse pattern, both aim to enhance the effectiveness of high dynamic range sampling by modulating the sampling interval or pulse pattern, which is further discussed below.

FIG. 1 is a functional block diagram illustrating time-of-flight (TOF) distance measuring system according to one embodiment of the present disclosure. The distance measuring system 100 is configured to detect the distance between a target 102 and the distance measuring system 100. It should be noted that the distance between the target 102 and the distance measuring system 100 is smaller than or is equal to the maximum detectable distance of the distance measuring system 100. For example (however, the present application is not limited thereto), the distance measuring system 100 can be a 3D imaging system, which can use the TOF technique to measure the distance of the surrounding target, thereby obtaining the depth of field and 3D image information.

It should be noted that, the distance measuring system 100 can be implemented as one of different types of TOF distance measuring system, such as a TOF-based optical distance measuring system, a TOF-based acoustic distance measuring system, a TOF-based radar distance measuring system, or other types of TOF distance measuring system. For the sake of brevity, the following embodiment is directed to the use of the distance measuring system 100 implemented as an optical distance measuring system to discuss the TOF distance measuring scheme according to the present application. However, persons having ordinary skill in the art should understand that the present TOF distance measuring scheme can be applied in any TOF distance measuring system.

The distance measuring system 100 can include (but is not limited to) a pulse generation unit 110, a control circuit 120, and a TOF sensor 130. The pulse generation unit 110 is configured to intermittently transmit a pulse having a pulse length T. After transmitting a pulse, the pulse generation unit 110 would stop transmitting another pulse for a period of time, wherein this period of time is much longer than or longer than the pulse length T. The pulse generation unit 110 can transmit one pulse again until the next time it is activated.

In the present application, the distance measuring system 100 can be a TOF-based optical distance measuring system, and hence, the pulse generation unit 110 can be implemented using a light pulse generation unit to generate a pulsed light signal EL. In the first scheme according to the present application, the pulsed light signal EL can be single light pulse that is generated intermittently. That is, the light pulse generation unit can intermittently transmit the single light pulse for use of the single pulse generated by the pulse generation unit 110 intermittently. For example, the pulse generation unit 110 can include (but is not limited to) a driving circuit and a light-emitting unit (not shown in FIG. 1). The driving circuit is configured to drive the light-emitting unit, so that the light-emitting unit intermittently transmits the single light pulse. The light-emitting unit can be (but is not limited to) a semiconductor laser (also referred to as laser diode (LD)), light-emitting diode (LED) or other light-emitting unit that can be used to generate the light pulse, wherein the light pulse generated by the semiconductor laser is coherent light, whereas the light pulse generated by the light-emitting diode is incoherent light.

It should be noted that the pulse generation unit 110 can generate other types of pulse, such as the acoustic pulse or electromagnetic pulse. For example, in the embodiment where the distance measuring system 100 is implemented as an acoustic distance measuring system, the pulse generation unit 110 can be implemented using an acoustic pulse generation device. The acoustic pulse generation device is configured to intermittently transmit a single acoustic pulse (e.g., ultrasonic pulse) as the single pulse generate by the pulse generation unit 110 intermittently. In another example, in the embodiment where the distance measuring system 100 is implemented as a radar distance measuring system, the pulse generation unit 110 can be implemented using an electromagnetic pulse generation device. The electromagnetic pulse generation device is configured to intermittently transmit single electromagnetic pulse as the single pulse generated by the pulse generation unit 110 intermittently.

The control circuit 120 is coupled to the pulse generation unit 110 and configured to control the pulse generation unit 110 to generate the pulsed light signal EL. For example, the control circuit 120 can control the pulse generation unit 110 to intermittently transmit a single light pulse. In another example, the control circuit 120 can control a driving circuit included in the pulse generation unit 110 so that the driving circuit drives a light-emitting unit included in the pulse generation unit 110 to intermittently transmit the single light pulse. The TOF sensor 130 is controlled by the control circuit 120 and configured to sample a reflected signal RL to detect the distance between the distance measuring system 100 (or the TOF sensor 130) and the target 102, wherein the reflected signal RL is generated by the pulsed light signal EL reflected from the target 102. In another embodiment, the control circuit 120 can be a main control unit in a terminal device and not included in the distance measuring system 100.

In the first scheme of the present application, the TOF sensor 130 can continuously perform multiple times of signal sampling according to a sampling time interval during a tunable predetermined time TR (for ease of illustration, represented by a waveform with a time length labeled TR), to generate a sampling result of the reflected signal RL. In other words, the reflected signal RL reaching at the TOF sensor 130 during the predetermined time TR can be sensed. Generally, since the reflected signals RL reflected from the near side and the far side would have different arrival time, the predetermined time TR can be set as greater than or equal to pulse length T (e.g., greater than or equal to a specific fold of the pulse length T) to increase the dynamic range, so that the reflected signals RL reflected from the near side and the far side could be captured. However, one disadvantage of this approach is that the amount of information received from the near side is often much greater than the amount of information received from the far side, causing the amount of information from the far side to be easily affected by the background light, thereby triggering shot noise. Therefore, the predetermined time TR in the present application is adjustable, and its details are described later.

After performing multiple times of signal sampling to generate the sampling result, the TOF sensor 130 can calculate a phase shift between the reflected signal RL and the pulsed light signal EL transmitted from the pulse generation unit 110 according to the sampling result. For example, the TOF sensor 130 can include (but is not limited to) a pixel array 132 and a processing circuit 134. The pixel array 132 includes a plurality of pixels (not shown in FIG. 1), wherein each pixel can include a photo sensor (not shown in FIG. 1) to generate a photo response signal in response to the reflected signal RL). The control circuit 120 can control the photo sensor of each pixel to selectively output the photo response signal corresponding to each pixel to the processing circuit 134.

The processing circuit 134 can perform one sampling upon the output of each pixel (e.g., the photo response signal of each pixel) at the sampling time interval during the predetermined time TR according to a sampling control signal SC (which can be generated by the control circuit 120) and generate a sampling result SR accordingly. Thereafter, the processing circuit 134 can perform signal processing upon the sampling result SR, wherein these signal processing can be, such as, mixed frequency processing and discrete Fourier transform, to calculate a phase shift between the reflected signal RL received by each pixel and the pulsed light signal EL transmitted from the pulse generation unit 110, thereby detecting the TOF of the pulsed light signal EL, and calculating the distance between the target 102 and a reference position according to the TOF. The reference position can be (but is not limited to) the position of the distance measuring system 100.

Figure 2:
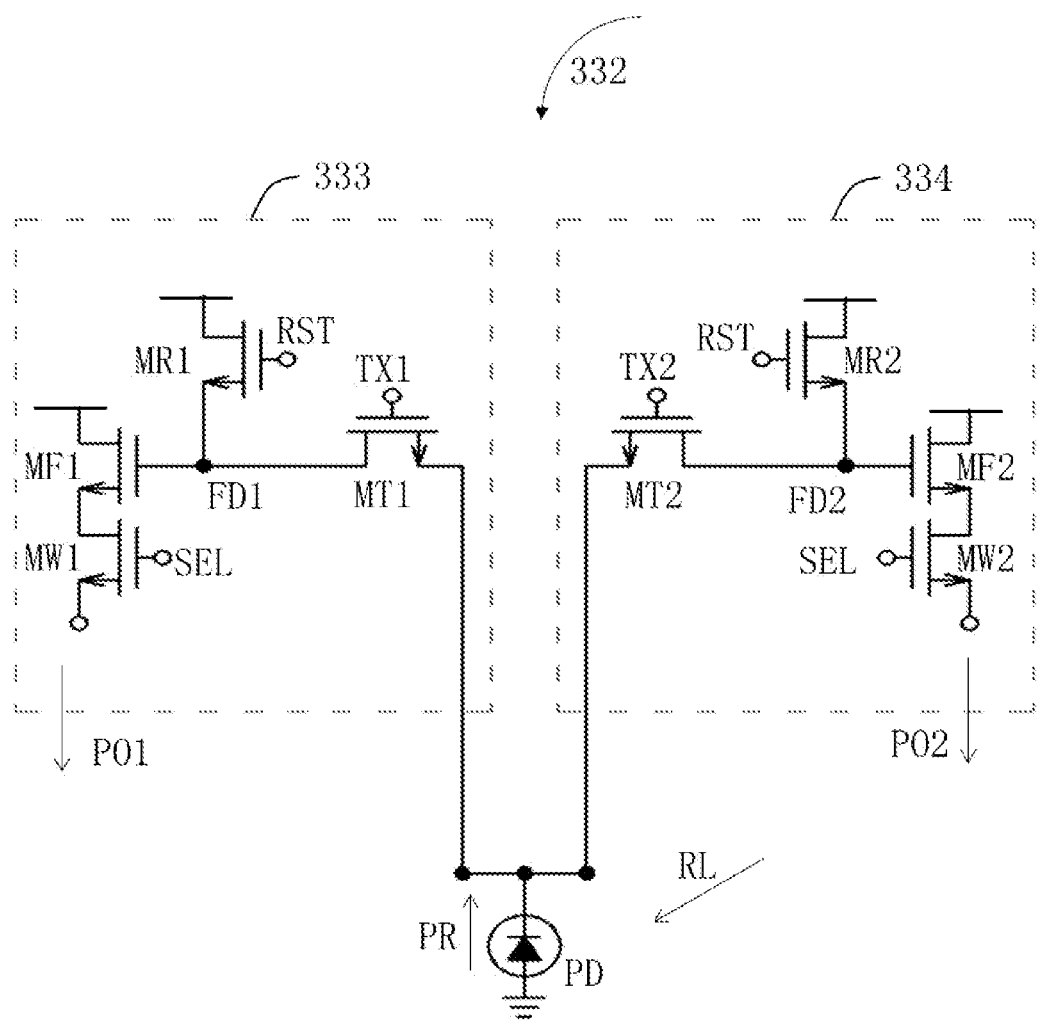
FIG. 2 is a schematic diagram illustrating the circuit structure of a single pixel in a pixel array in the distance measuring system shown in FIG. 1 according to one embodiment of the present disclosure.

For ease of illustration, the TOF distance measuring scheme disclosed by the present application is discussed using an embodiment of a pixel circuit. However, the present application is not limited thereto. FIG. 2 is a schematic diagram illustrating the circuit structure of a single pixel in the pixel array 132 shown in FIG. 1 according to one embodiment of the present disclosure. Reference is made to both FIG. 1 and FIG. 2. In this embodiment, the pixel 332 includes (but is not limited to) a photo sensor PD, a first readout circuit (e.g., a photoelectric readout circuit) 333 and a second readout circuit (e.g., a photoelectric readout circuit) 334. The photo sensor PD (e.g., a photodiode) is configured to perform the light sensing operation. For example, the photo sensor PD can sense the reflected signal RL to generate a photo response signal PR correspondingly, wherein the photo response signal PR can be outputted using one readout circuit of the first readout circuit 333 and the second readout circuit 334. In some embodiments, the photo sensor PD may convert the received photo signal into a photoelectric current signal of corresponding magnitude (i.e., the photo response signal PR may be a current signal characterizing the magnitude of the photo signal), and the first readout circuit 333/second readout circuit 334 is configured to read out the photoelectric current signal.

The first readout circuit 333 can selectively transmit the photo response signal PR generated by the photo sensor PD according to a first control signal TX1 to generate a first pixel output PO1, wherein the first control signal TX1 can be provided by the control circuit 120. That is, the pixel 332 can selectively transmit the photo response signal PR to the processing circuit 130 via the first readout circuit according to the first control signal TX1 to generate the first pixel output P01, which is outputted to the processing circuit 130. The second readout circuit 334 can selectively transmit the photo response signal PR generated by the photo sensor PD according to a second control signal TX2 to generate a second pixel output PO2, wherein the second control signal TX2 can be provided by the control circuit 120 and has a phase that is different from the first control signal TX1. The pixel 332 can selectively transmit the photo response signal PR to the processing circuit 130 via the second readout circuit according to the second control signal TX2 to generate the second pixel output PO2, which is outputted to the processing circuit 130. In the present embodiment, the first control signal TX1 and the second control signal TX2 can be provided by the control circuit 120 of FIG. 1.

In the present embodiment, the first readout circuit 333 can include (but is not limited to) a first reset transistor MR1, a first transmit transistor MT1, a first output transistor MF1, and a first readout transistor MW1. The second readout circuit 334 includes (but is not limited to) a second reset transistor MR2, a second transmit transistor MT2, a second output transistor MF2, and a second readout transistor MW2. Both the first reset transistor MR1 and the second reset transistor MR2 reset a first floating diffusion node FD1 and a second floating diffusion node FD2, respectively, according to a reset signal RST, wherein the reset signal RST can be provided by the control circuit 120. Both the first transmit transistor MT1 and the second transmit transistor MT2 are coupled to the photo sensor PD and are respectively conducted according to the first control signal TX1 and the second control signal TX2; i.e., the first transmit transistor MT1 and the second transmit transistor MT2 are respectively under the control of the first control signal TX1 and the second control signal TX2, to connect and disconnect from the photo sensor PD. The first output transistor MF1 and the first output transistor MF2 are respectively configured to amplify the voltage signals of the first floating diffusion node FD1 and the second floating diffusion node FD2, to generate a first pixel output PO1 and a second pixel output PO2, respectively. Both the first readout transistor MW1 and the second readout transistor MW2 selectively output the first pixel output PO1 and the second pixel output PO2, respectively, according to a selection signal SEL, wherein the selection signal SEL can be provided by the control circuit 120.

Figure 3:
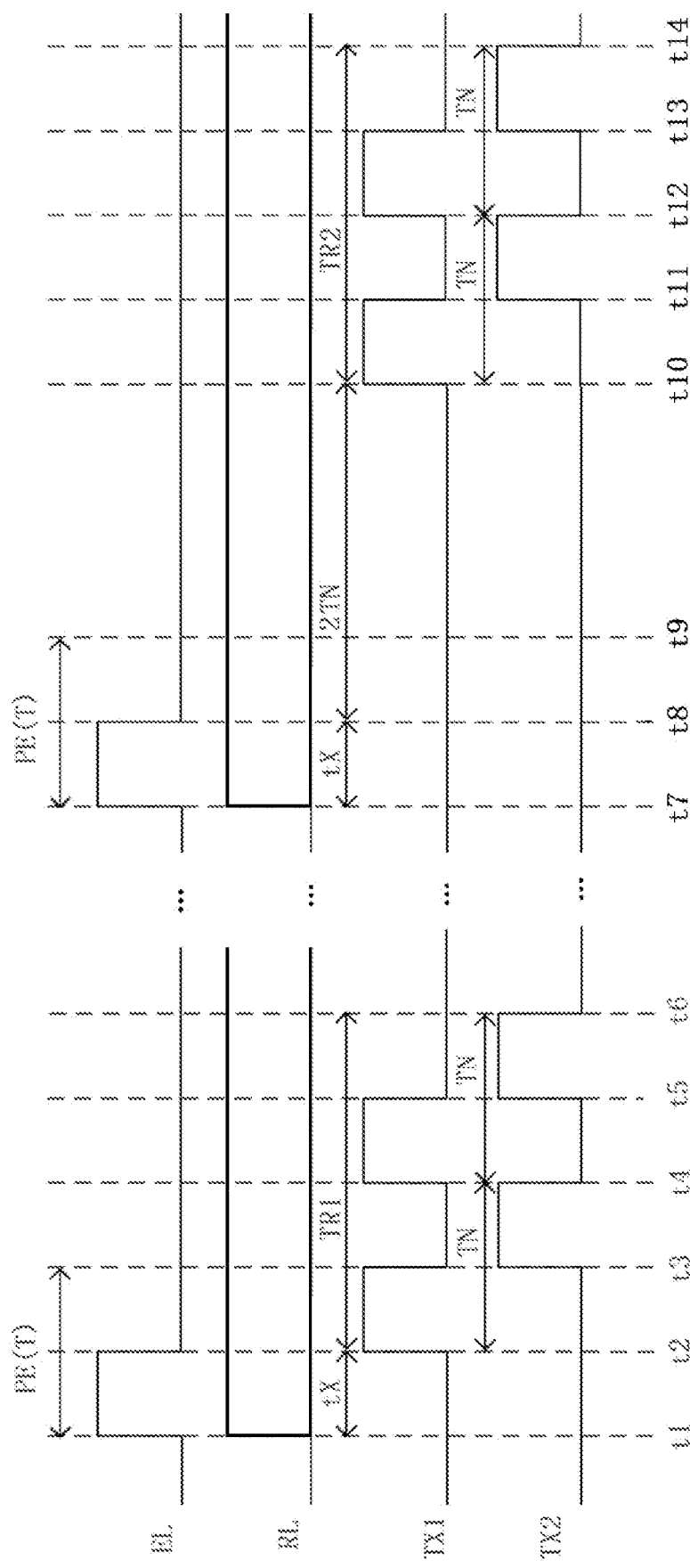
FIG. 3 is a schematic diagram illustrating the signal timing of the pixel shown in FIG. 2 according to one embodiment of the present disclosure.

Reference is made to FIG. 1, FIG. 2, and FIG. 3. FIG. 3 is a schematic diagram illustrating the signal timing of the pixel 332 shown in FIG. 2 according to one embodiment of the present disclosure. In FIG. 3, the pulse generation unit 110 transmits a total of two pulses PE, and correspondingly, the sensor 130 performs two samplings, wherein the two samplings are carried out in substantially the same way but at different time points, so that the first sampling samples a portion of the reflected signal RL that is reflected to the sensor 130 faster, whereas the second sampling samples a portion of the reflected signal RL that is reflected to the sensor 130 slower.

Further, for the first pulse PE, the first pulse PE is transmitted at the time point t1 and then reflected to become the reflected signal RL; since the reflected signal RL carries the energy reflected from the first pulse PE at different depths, and the energy reflected from the near side reaches the pixel 332 faster than the energy reflected from the far side. That is, in theory, any time from the time point t1 onwards may carry the energy of the reflected signal RL of the first pulse PE (please refer to the labeling of the reflected signal RL after the time point t1 in FIG. 3). Generally, in high dynamic range applications, the length of the predetermined time TR can be increased for each sampling, so that the amount of information sampled corresponds to a wider depth range, but the information reflected from the far side will be far less than that reflected from the near side, causing the information reflected from the far side to be susceptible to noise interference.

In this embodiment, different target depths are sampled for different pulse PEs. For example, for the first pulse PE in FIG. 3, the control circuit 120 causes the sensor 130 to sample a first signal for a time range at a predetermined time TR1; for the second pulse PE in FIG. 3, the control circuit 120 causes the sensor 130 to sample a second signal for a time range at a predetermined time TR2. In this embodiment, the predetermined time TR1 is later by a first time difference tX with respect to the transmitting time of the first pulse PE, the predetermined time TR2 is later by a second time difference tX±2TN with respect to the transmitting time of the second pulse PE, and the predetermined time TR1 and the predetermined time TR2 are of the same length. Thus, the first signal sampling may sample the energy of the first pulse PE reflected back to the sensor 130 from a near side in the predetermined time TR1; the second signal sampling may sample the energy of the second pulse PE reflected back to the sensor 130 from a far side in the predetermined time TR2, both with different and non-duplicative target sampling depths.

In the present embodiment, multiple times of pulse PE (for example, thousands of times) are transmitted, and the first signal sampling or the second signal sampling is carried out based on the predetermined time TR1 or the predetermined time TR2; for example, multiple pulses PE may be assigned corresponding to the first signal sampling or the second signal sampling, respectively, based on a predetermined ratio, wherein the number of pulse PE assigned corresponding to the first signal sampling is less than the number of pulse PE assigned corresponding to the second signal sampling, in order to balance the energy from the near side and far side, so that the energy from the near side is not overexposed and the energy from the far side is pulled up. By way of example, 80% of the pulses PE corresponding to the second signal sampling are sampled for far side information; the remaining 20% of the pulses PE corresponding to the first signal sampling are sampled for near side information. The predetermined ratio can be adjusted according to the desired dynamic range.

The first time difference tX in FIG. 3 may be set to, for example, half of the pulse length T, but the present application is not limited thereto. The difference between the first time difference and the second time difference may also be greater or less than two sampling intervals TN, but should be no less than one sampling interval TN. The predetermined time TR1 may include two sampling intervals TN (i.e., time point t2 to time point t4 and time point t4 to time point t6); the predetermined time TR2 may include two sampling intervals TN (i.e., time point t10 to time point t12 and time point t12 to time point 14), where the time length of each sampling interval TN is equal to the pulse length T. The first control signal TX1 has the same waveform in each sampling interval TN; the second control signal TX2 has the same waveform in each sampling interval TN. The second control signal TX2 and the first control signal TX1 may have a phase difference of 180 degrees between them. In certain embodiments, the length of the predetermined time can be adjusted according to the desired dynamic range, for example, the predetermined time TR1 is changed to the predetermined time TR3, and the predetermined time TR3 can be used for the third signal sampling.

Figure 4:
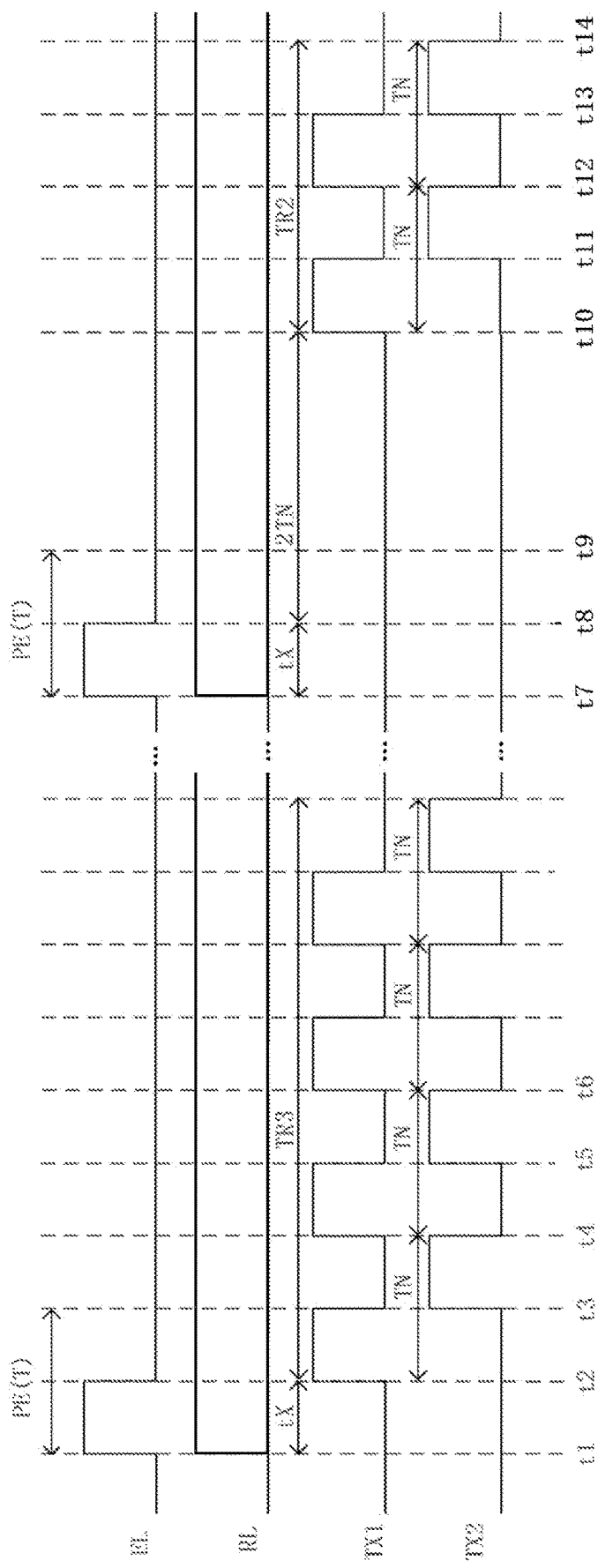
FIG. 4 is a schematic diagram illustrating the signal timing of the pixel shown in FIG. 2 according to another embodiment of the present disclosure.

Referring to FIG. 4, in which the predetermined time TR 3 can include 4 sampling intervals TN, for example, the predetermined time TR 3 starts from time point t2 and lasts for 4 sampling intervals TN. In this way, the predetermined time TR 3 can include the dynamic ranges covered by the predetermined time TR 1 and the predetermined time TR 2 simultaneously. Hence, it is possible to arbitrarily assign a number of pulse PE to different types of signal samplings according to the required dynamic range. For example, in certain embodiments, 15% of the pulses PE can be assigned to the third signal sampling and 85% to the second signal sampling, or 10% of the pulses PE. can he assigned to the first signal sampling, 10% to the third signal sampling, and 80% to the second signal sampling, according to the predetermined ratio.

Moreover, the output of each pixel is sampled at the sampling interval in each sampling interval TN, wherein the sampling interval may be one-fourth of the pulse length T. However, the present application is not limited to this, and the sampling interval may also be one-eighth or one-sixteenth of the pulse length T.

Figure 5:
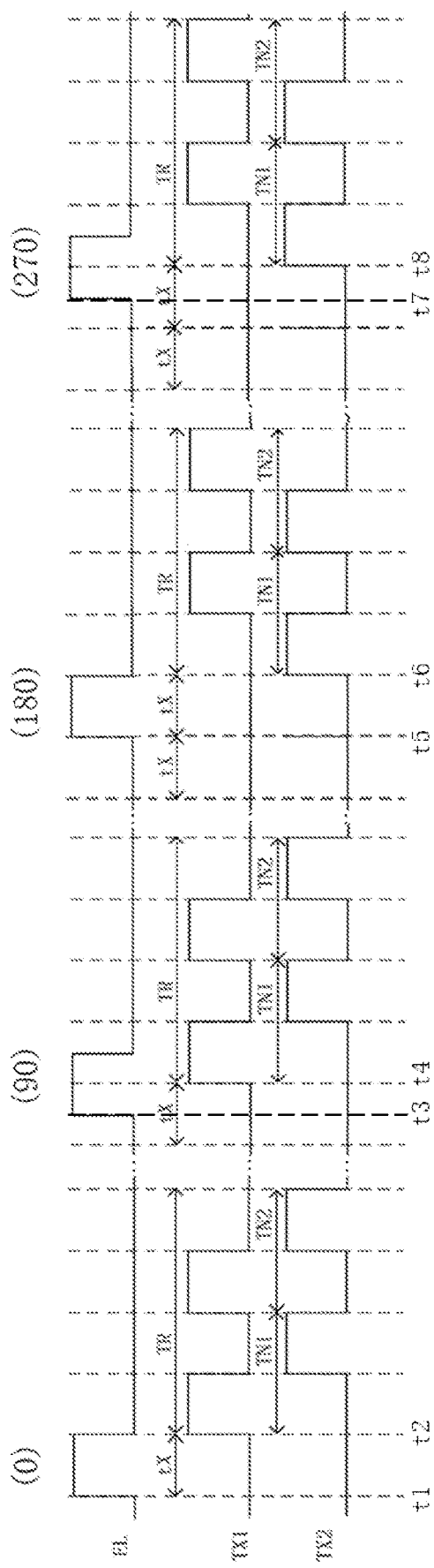
FIG. 5 is a schematic diagram illustrating the signal timing of the pixel shown in FIG. 2 according to yet another embodiment of the present disclosure.

In the present application, the pulse generation unit 110 intermittently transmits a plurality of pulses PE with a 0-degree phase, and then intermittently transmits a plurality of phase pulses PE with a 90-degree phase, and then intermittently transmits a plurality of phase pulses PE with a 180-degree phase, and then intermittently transmits a plurality of phase pulses PE with a 270-degree phase. In certain embodiments, the first control signal TX1 and the second control signal TX2 can be adjusted for pulses PEs with different phases. For example, for pulses PEs with phase 0 and 90 degrees, the first control signal TX1 and the second control signal TX2 of the same waveform can be used; for pulses PEs with phase 180 and 270 degrees, the first control signal TX1 and the second control signal TX2 can be switched in pairs and shifted back by tX (as shown in FIG. 5), so that the starting time point t6 of the predetermined time TR of the pulse PE corresponding to the phase of 180 degrees and the transmitting time point t5 of the pulse PE of the phase of 180 degrees still have a first time difference tX. Without this adjustment, the starting time point of the predetermined time TR of the pulse PE corresponding to the phase of 180 degrees will be at t5, making the predetermined time TR need to be extended by tX to maintain the phase of 180 degrees, so that the time TR needs to be extended by tX to maintain the dynamic range.

Figure 6:
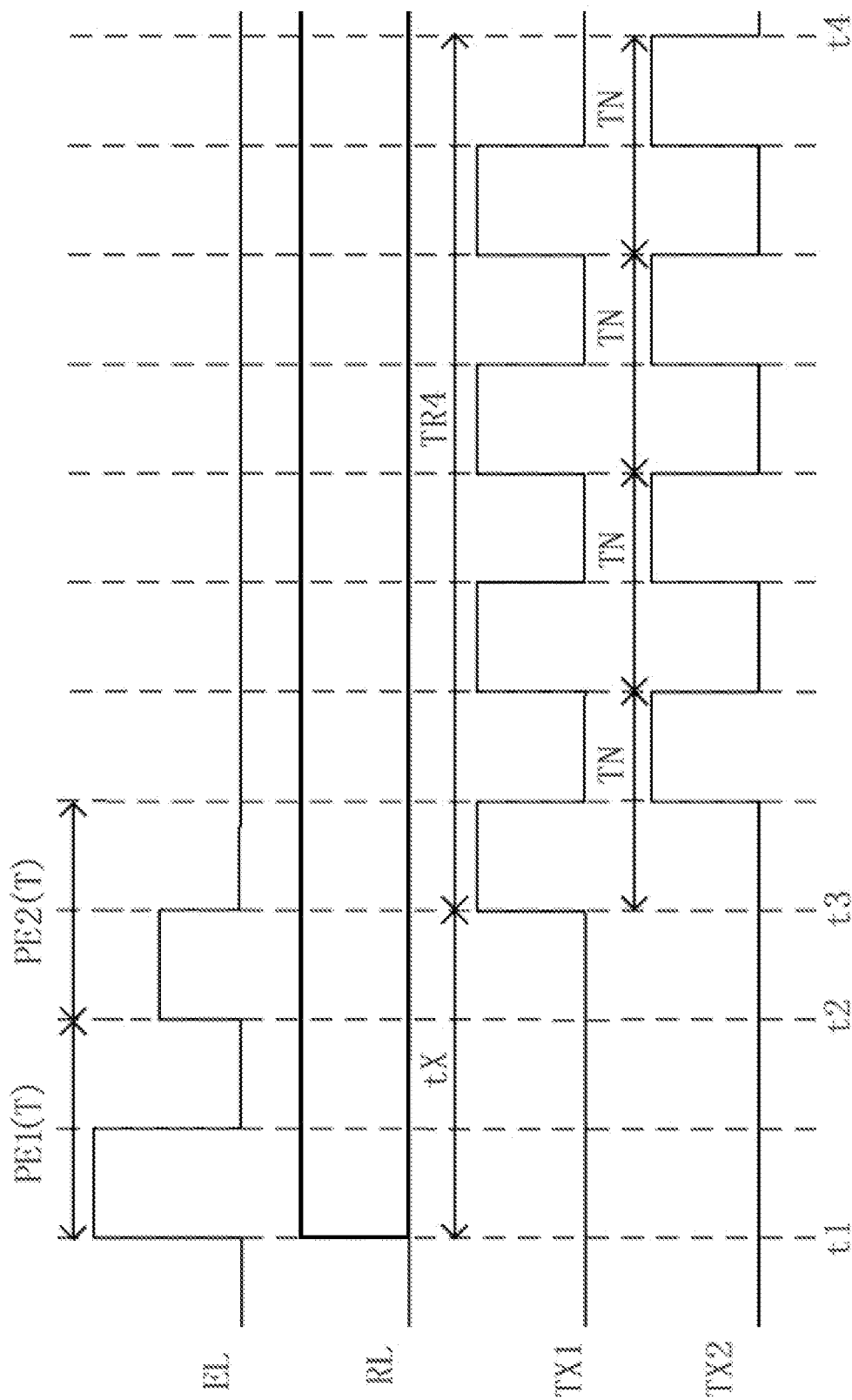
FIG. 6 is a schematic diagram illustrating the signal timing of the pixel shown in FIG. 2 according to still another embodiment of the present disclosure.

The second scheme of the present application is substantially the same as the above-mentioned first scheme, except that in the second scheme, the predetermined time TR 4 of the TOF sensor 130 is a fixed length, for example, the predetermined time TR 4 is four times the length of the sampling interval TN; however, the present embodiment is not limited thereto. Moreover, the control circuit 120 controls the pulse generation unit 110 to intermittently transmit a pulse set instead of the single pulse described in the above-mentioned first scheme. As shown in FIG. 6, the pulse set includes a first pulse PE1 and a second pulse PE2, wherein the first pulse PE1 and the second pulse PE2 have the same pulse length T. The transmitting time of second pulse PE2 falls behind the first pulse PE1 in the same pulse set by at least the pulse length T. That is, the transmitting time of the second pulse PE2 can fall behind the first pulse PE1 in the same pulse set by more than 2 pulse lengths T.

The intensity of the first pulse PE1 and the intensity of the second pulse PE2 are different; in the present embodiment, it is deliberately design so that the intensity of the first pulse PE1 is higher than the intensity of second pulse PE2, and the starting time point of the predetermined time TR 4 is delayed at least to the transmitting time point of the second pulse PE2. Roughly speaking, the energy reflected back to the TOF sensor 130 in the first pulse PE1. before the start of the predetermined time TR4 is too late to be sampled, and in the predetermined time TR4, the TOF sensor 130 will only receive the energy in the first pulse PE1 that is reflected back to the TOF sensor 130 at a slower rate (i.e., the far side information). Similarly, in the predetermined time TR4, the TOF sensor 130 will only receive the energy in the second pulse PE2 that is reflected back to the TOF sensor 130 at a faster rate (i.e., the near side information). Since the intensity of the first pulse PE1 is higher, the far side information energy of the first pulse PE1 can be boosted to balance it with the near side information energy of the second pulse PE2. Thus, by designing the intensities of the first pulse PE1 and the second pulse PE2 to be of different level, the energy of the far side information and the near side information received in the predetermined time TR4 can be controlled at approximately the same level.

The foregoing outlines features of several embodiments of the present application so that persons having ordinary skill in the art may better understand the various aspects of the present disclosure. Persons having ordinary skill in the art should appreciate that they may readily use the present disclosure as a basis for designing or modifying other processes and structures for carrying out the same purposes and/or achieving the same advantages of the embodiments introduced herein. Persons having ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A time-of-flight (TOF) distance measuring method, comprising:
    intermittently transmitting a plurality of first pulses from a pulse generation unit, wherein the plurality of first pulses are reflected by a target to generate a plurality of first reflected signals;
    controlling a TOF sensor to selectively perform a first signal sampling or a second signal sampling upon the plurality of first reflected signals respectively to generate a first sampling result, wherein there is a first time difference between a starting time point of the first signal sampling and a transmitting time point of the first pulse corresponding to the first signal sampling, and the first signal sampling lasts for a first predetermined time, and there is a second time difference between a starting time point of the second signal sampling and a transmitting time point of the first pulse corresponding to the second signal sampling, and the second signal sampling lasts for second predetermined time, and the first time difference is smaller than the second time difference;
    detecting TOFs of the plurality of first pulses from the pulse generation unit to the TOF sensor according to the first sampling result; and
    determining a distance between the target and a reference position according to the TOFs,
    wherein the first predetermined time comprises at least one sampling interval adjacent to the starting time point of the first predetermined time; and the second predetermined time comprises the at least one sampling interval adjacent to the starting time point of the second predetermined time,
    wherein a number of the sampling interval in the first predetermined time is greater than a number of the sampling interval in the second predetermined time.

2. The distance measuring method of claim 1, wherein the sampling interval has a fixed time length.

3. The distance measuring method of claim 2, wherein the time length of the sampling interval is equal to a pulse length of the first pulse.

4. The distance measuring method of claim 3, wherein a difference between the second time difference and the first time difference is at least the time length of the sampling interval.

5. The distance measuring method of claim 1, wherein the step of controlling the TOF sensor to selectively perform the first signal sampling or the second signal sampling upon the plurality of first reflected signals respectively comprises:
assigning each of the plurality of first reflected signals to correspond to the first signal sampling or the second signal sampling according to a predetermined ratio, wherein the number of the plurality of first reflected signals assigned to correspond to the first signal sampling is less than the number of the plurality of first reflected signals assigned to correspond to the second signal sampling.

6. The distance measuring method of claim 1, wherein the step of controlling the TOF sensor to generate the first sampling result comprises:
sensing each of the plurality of first reflected signals to generate a response signal;
during the sampling interval, selectively using a first readout circuit to receive the response signal according to a first control signal, to generate a first pixel output, and selectively using a second control circuit to receive the response signal according to a second control signal, to generate a second pixel output, wherein the second control signal and the first control signal have different phases; and
sampling the first pixel output and the second pixel output every sampling time interval, so as to generate the first sampling result according to the first pixel output and the second pixel output.

7. The distance measuring method of claim 6, wherein a phase difference between the first control signal and the second control signal is 180 degrees.

8. The distance measuring method of claim 6, wherein the sampling time interval is ¼ of the pulse length.

9. The distance measuring method of claim 1, further comprising:
intermittently transmitting a plurality of second pulses from the pulse generation unit, wherein the plurality of second pulses are reflected by the target to generate a plurality of second reflected signals, and a phase difference between the second pulse and the first pulse is 180 degrees; and
controlling the TOF sensor to selectively perform the first signal sampling or the second signal sampling upon the plurality of second reflected signals respectively to generate a second sampling result, wherein the starting time point of the first signal sampling and the transmitting time point of the second pulse corresponding to the first signal sampling have the first time difference, and the first signal sampling lasts for the first predetermined time, and the starting time point of the second signal sampling and the transmitting time point of the second pulse corresponding to the second signal sampling have the second time difference, and the second signal sampling lasts for the second predetermined time.

10. The distance measuring method of claim 9, wherein the step of detecting the TOFs of the plurality of first pulses from the pulse generation unit to the TOF sensor according to the first sampling result comprises:
detecting the TOFs according to the first sampling result and the second sampling result.

11. A time-of-flight (TOF) distance measuring system, comprising:
a pulse generation unit;
a control circuit, coupled to the pulse generation unit and configured to control the pulse generation unit to intermittently transmit a plurality of first pulses, wherein the plurality of first pulses are reflected by a target to generate a plurality of first reflected signals; and
a TOF sensor, controlled by the control circuit and configured to selectively perform a first signal sampling or a second signal sampling upon the plurality of first reflected signals respectively to generate a first sampling result, wherein there is a first time difference between a starting time point of the first signal sampling and a transmitting time point of the first pulse corresponding to the first signal sampling, and the first signal sampling lasts for a first predetermined time, and there is a second time difference between a starting time point of the second signal sampling and a transmitting time point of the first pulse corresponding to the second signal sampling, and the first time difference is smaller than the second time difference, and the second signal sampling lasts for second predetermined time, and detecting TOFs of the plurality of first pulses from the pulse generation unit to the TOF sensor according to the first sampling result, and determining a distance between the target and a reference position according to the TOFs,
wherein the first predetermined time comprises at least one sampling interval adjacent to the starting time point of the first predetermined time; and the second predetermined time comprises the at least one sampling interval adjacent to the starting time point of the second predetermined time,
wherein a number of the sampling interval in the first predetermined time is greater than a number of the sampling interval in the second predetermined time.

12. The distance measuring system of claim 11, wherein the sampling interval has a fixed time length.

13. The distance measuring system of claim 12, wherein the time length of the sampling interval is equal to a pulse length of the first pulse, and a difference between the second time difference and the first time difference is at least the time length of the sampling interval.

14. The distance measuring system of claim 12, wherein the TOF sensor comprises:
a pixel array, comprising a plurality of pixels, wherein each pixel comprises:
a photo sensor, configured to sense the plurality of first reflected signals respectively to generate a response signal;
a first readout circuit, configured to selectively transmit the response signal to generate a first pixel output according to a first control signal generated by the control circuit during the sampling interval; and
a second readout circuit, configured to selectively transmit the response signal to generate a second pixel output according to a second control signal generated by the control circuit during the sampling interval, wherein a phase difference between the first control signal and the second control signal is 180 degrees; and
a processing circuit, coupled to the pixel array and the control circuit and configured to sample the first pixel output and the second pixel output every sampling time interval according to a sampling control signal generated by the control circuit, so as to generate the first sampling result according to the first pixel output and the second pixel output.

15. The distance measuring system of claim 14, wherein the sampling time interval is ¼ of the pulse length.

16. The distance measuring system of claim 11, wherein:
the control circuit further controls the pulse generation unit to intermittently transmit a plurality of second pulses, wherein the plurality of second pulses are reflected by the target to generate a plurality of second reflected signals, and a phase difference between the second pulse and the first pulse is 180 degrees; and
the TOF sensor is further configured to selectively perform the first signal sampling or the second signal sampling upon the plurality of second reflected signals respectively to generate a second sampling result, wherein the starting time point of the first signal sampling and the transmitting time point of the second pulse corresponding to the first signal sampling have the first time difference, and the first signal sampling lasts for the first predetermined time, and the starting time point of the second signal sampling and the transmitting time point of the second pulse corresponding to the second signal sampling have the second time difference, and the second signal sampling lasts for the second predetermined time, and the TOF sensor is further configured to detect the TOFs according to the first sampling result and the second sampling result.

17. A time-of-flight (TOF) distance measuring method, comprising:
intermittently transmitting a plurality of pulse sets from a pulse generation unit, wherein each pulse set includes a first pulse and a second pulse, the intensity of the first pulse and the intensity of the second pulse are different, and the plurality of pulse sets are reflected by a target to generate a plurality of reflected signal sets, wherein the first pulse and the second pulse have the same pulse length, and a transmitting time of the second pulse falls behind the first pulse in the same pulse set by at least the pulse length;
controlling a TOF sensor to perform signal sampling upon the plurality of reflected signal sets respectively to generate a sampling result, wherein the signal sampling lasts for a predetermined time;
detecting TOFs of the plurality of pulse sets from the pulse generation unit to the TOF sensor according to the sampling result; and
measuring the distance between the target and a reference position according to the TOFs.

* * * * *